(12) United States Patent
Jannard et al.

(10) Patent No.: US 7,347,545 B1
(45) Date of Patent: Mar. 25, 2008

(54) SPORTS-SPECIFIC SHIELD

(75) Inventors: James Jannard, Eastsound, WA (US);
Peter Yee, Irvine, CA (US); David Ginther, Ladera Ranch, CA (US);
Carlos Reyes, Rancho Santa Margarita, CA (US)

(73) Assignee: Oakley, Inc., Foothill Ranch, CA (US)

( * ) Notice: Subject to any disclaimer, the term of this patent is extended or adjusted under 35 U.S.C. 154(b) by 0 days.

(21) Appl. No.: 11/545,103

(22) Filed: Oct. 5, 2006

(51) Int. Cl.
*G02C 1/04* (2006.01)

(52) U.S. Cl. .......................... 351/106; 351/86; 351/88; 351/138

(58) Field of Classification Search ................ 351/106, 351/103, 88, 86, 83, 136, 138, 135, 41
See application file for complete search history.

(56) References Cited

U.S. PATENT DOCUMENTS

| | | | |
|---|---|---|---|
| 3,233,250 A | 2/1966 | Jonassen | |
| 4,178,080 A | 12/1979 | Elder | |
| 4,951,322 A | 8/1990 | Lin | |
| 5,576,775 A * | 11/1996 | Bolle | 351/62 |
| 5,619,287 A | 4/1997 | Tseng | |
| 6,386,704 B1 * | 5/2002 | Wu | 351/106 |
| 6,908,193 B2 | 6/2005 | Cyr | |

\* cited by examiner

*Primary Examiner*—Hung X. Dang
(74) *Attorney, Agent, or Firm*—Knobbe Martens Olson & Bear LLP

(57) ABSTRACT

An eyeglass is provided for component weight without reducing the overall structural integrity of the eyeglass, and for allowing adjustability of the eyeglass to optimize optical and protective qualities during activities having differing head angles and primary lines of sight. The eyeglass can comprise a lens, a frame, and a nosepiece. The frame can have opposing terminals and an upper groove extending at least partially along the frame and a downwardly extending post. The nosepiece can have a mounting component extending upwardly to engage the post, and the lens can be cooperatively retained between the frame and the nosepiece. Sets of corresponding nose pieces and lenses are provided, to optimize the eyeglasses for different primary viewing axes in the vertical plane.

20 Claims, 8 Drawing Sheets

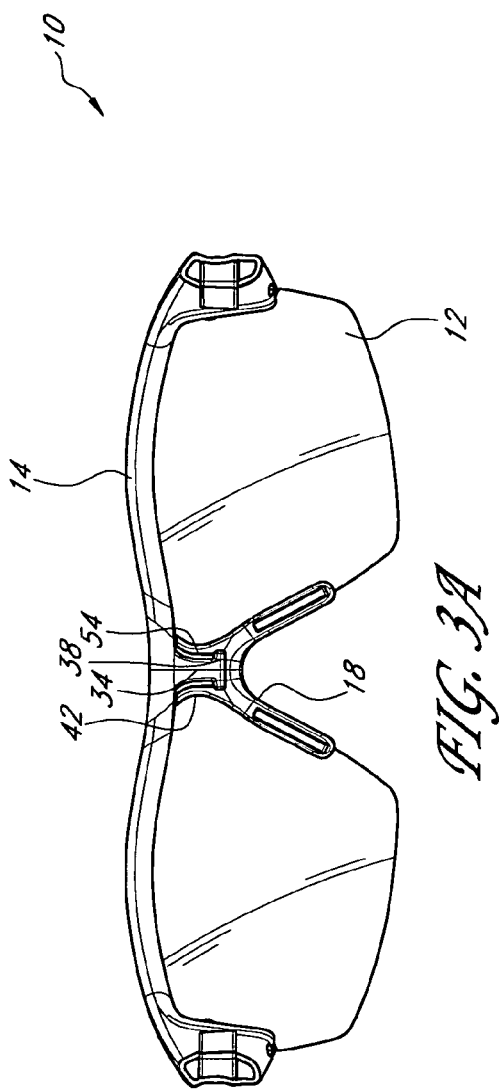
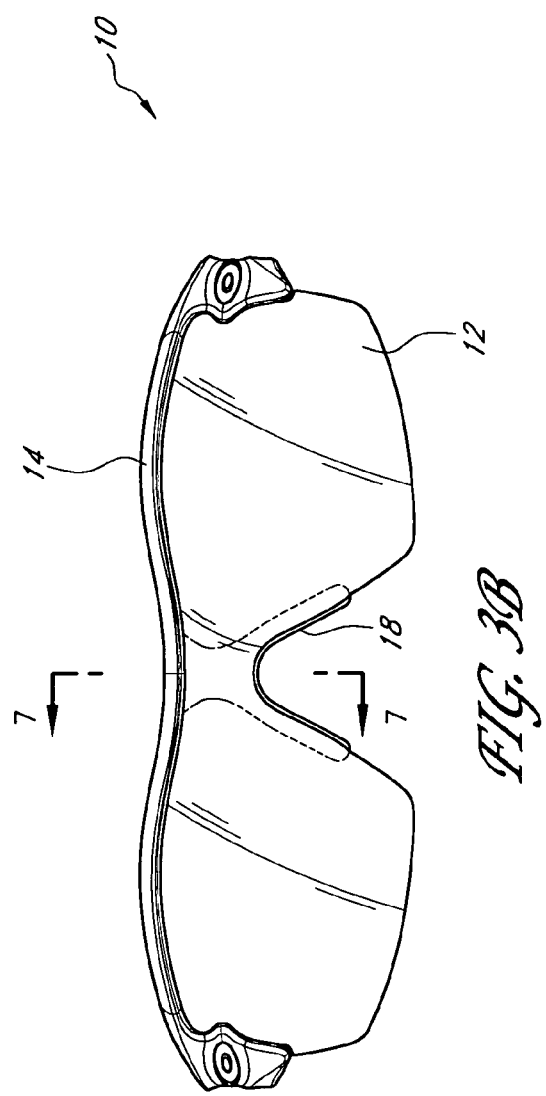
FIG. 3A
FIG. 3B

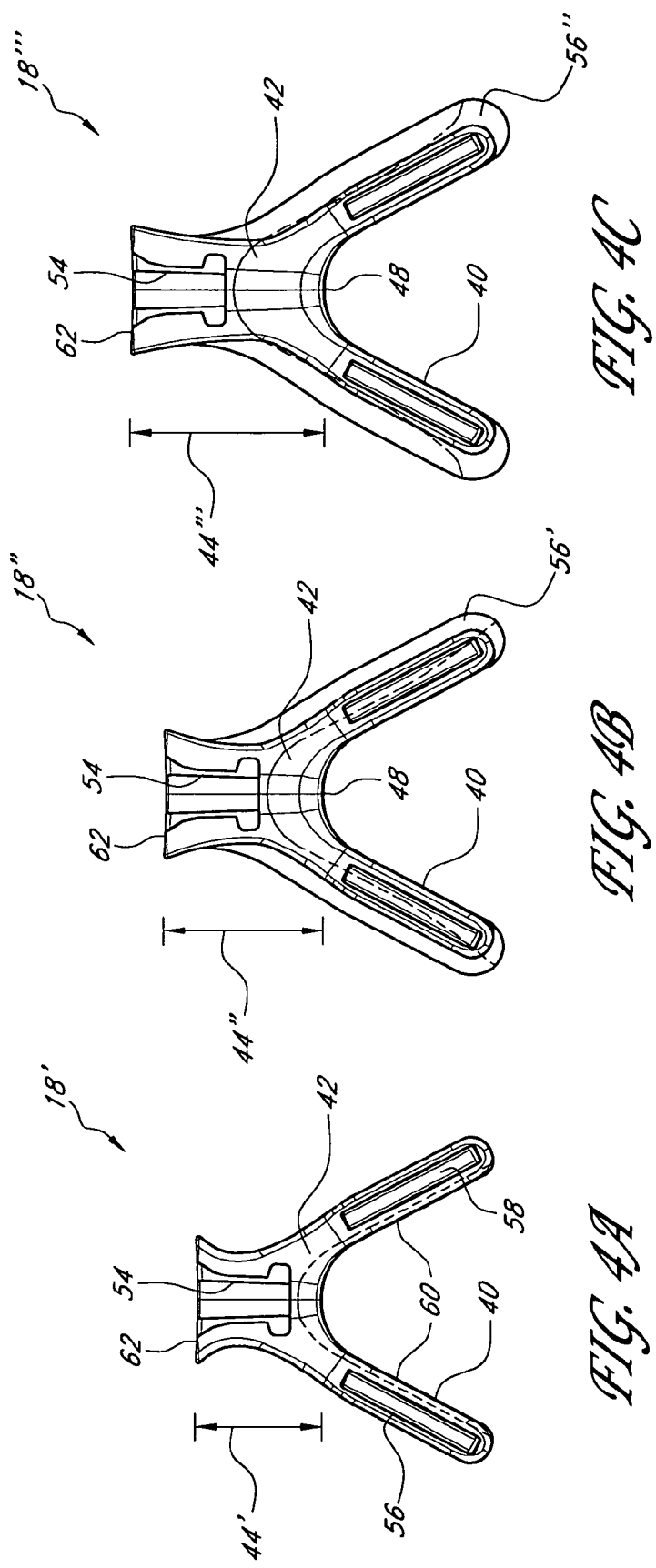

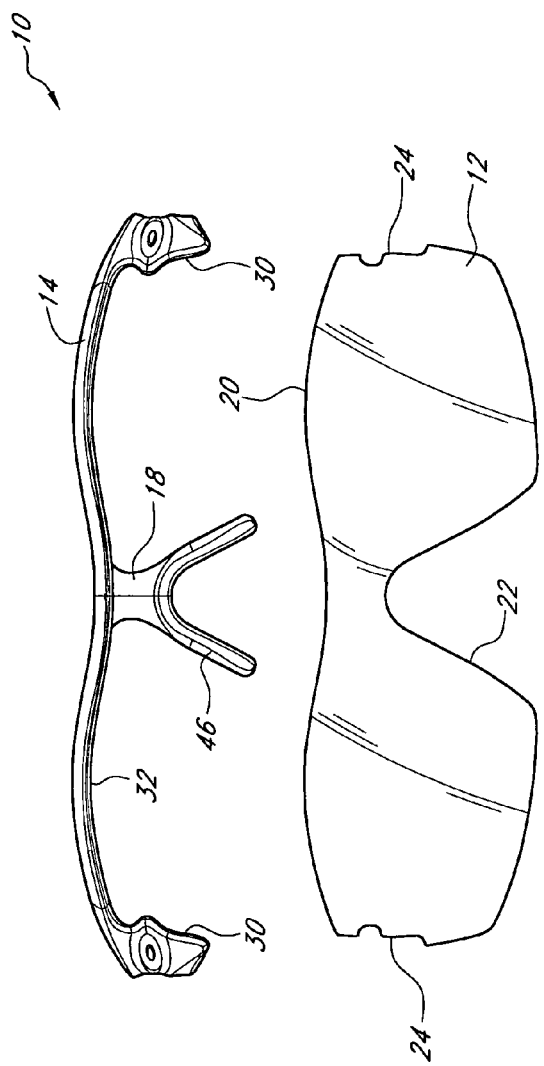
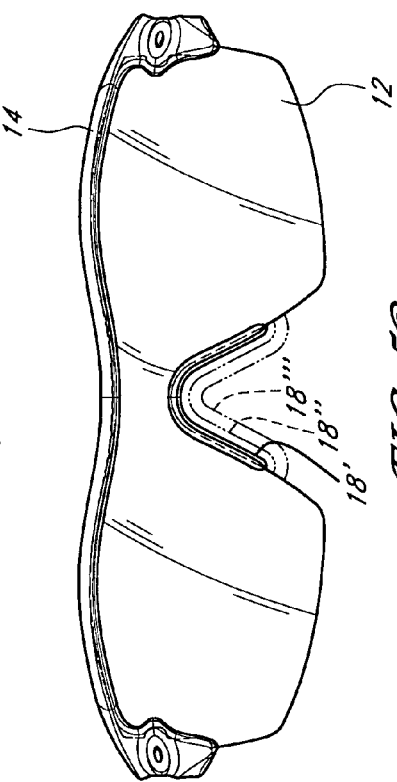
FIG. 5A
FIG. 5B

SPORTS-SPECIFIC SHIELD

BACKGROUND

The present invention relates generally to eyeglasses, and more particularly to a uniquely configured eyeglass shield that permits a wearer to adjust a frame thereof to provide a variety of vertical viewing angles for specific sporting applications. As discussed in greater detail below, embodiments of the present invention provide a sports-specific shield which can be selectively adjusted by the wearer in order to customize the configuration and fit of the eyeglass shield for beneficial use in specific activities, without requiring the use of tools. The resulting eyeglass shield can therefore be utilized in demanding sporting situations that require either a heads-up or heads-down posture of the wearer, such as competitive running, driving, skiing, or bicycle racing.

Eyeglasses, and sunglasses in particular, have long been designed with the general objective of blocking the sun or other sources of bright light from one's eyes. Over time, various features and advancements in this technology have been developed. The evolution of numerous designs of dual and unitary lens glasses initially differed essentially only in aesthetic features. However, eyeglass and lens designs have further developed in response to various optical considerations such as optical clarity, resolution, field of vision, refraction, and other such qualities. Typically, the optical qualities of the lens are best when the wearer's line of sight (LOS) extends in parallel to the optical center line (OCL) the lens.

Although these advancements in eyeglass technology have provided substantial benefits for eyeglass wearers participating in a broad range of activities, several sporting activities often require the wearer to assume body postures that displace the wearer's LOS particularly in the vertical plane from consistently being aligned with the OCL of particular lens. In addition, unique facial structures and geometries can result in different fits that similarly prevent different wearers from commonly enjoying the superior optical characterisitics of a given eyeglass.

Many sporting activities may be characterized as requiring the user to assume either a heads-up or a heads-down posture. In the heads-up posture, which is illustrated in accompanying FIG. 6A, a wearer's head is in a generally upright vertical position directly above the shoulders. Thus, the OCL of the eyeglass lenses and the wearer's LOS tend to be aligned parallel and point more or less straight ahead. Activities such as running, driving, and the like, tend to encourage a heads-up posture of the wearer.

In the heads-down posture, a wearer assumes a generally forward-leaning posture with the head extending forwardly of the torso, shown generally in FIG. 6B. In the heads-down posture, the head is tucked in an aerodynamic position with the OCL of the eyeglass lens typically being directed at the ground in front of the wearer; while the LOS is angularaly displaced upwardly with respect to the long. Thus, in order to optimize forward vision the wearer must lift their head upwardly from the racing posture, in order to bring their LOS into parallel with the OCL. The racing posture also brings the LOS high enough on conventional lenses that the upper frame can limit the field of view in the vertical plane. Activities such as bicycle racing and others commonly require the wearer to assume a heads-down posture for long periods of time.

Finally, unique facial geometries can prevent some wearers from enjoying superior optical characteristics of a given frame and lens system. A given pair of eyeglasses often fits differently on different wearers due to differences in facial structure. As a result, some wearer's straight-ahead LOS may not pass through the lens in parallel with the OCL. For example, an eyeglass that has been designed to fit a majority of wearers may nevertheless sit too high or too low on certain wearers depending on the structure and geometry of their nose and face. Therefore, the facial structure, as well as the particular activity in which the wearer is engaged, can cause the eyeglass have a particular fit on the wearer that prevents optimal vertical alignment of the OCL of the lens with the desired LOS of the wearer.

SUMMARY

In light of the above-mentioned deficiencies of eyeglass design, there is a need in the art for an improved eyeglass that allows a wearer to adjust the fit and/or optical orientation of the eyeglass depending on the activity in which the wearer is involved. Further, there is a need in the art for an eyeglass that can be adjusted to provide superior optical qualities that in a variety of eyeglass configurations. There is a need in the art for an adjustable eyeglass that allows the wearer to align their desired LOS with respect to the OCL of the lens and that can be used in both heads-up and heads-down activities. Furthermore, there is a need in the art for an eyeglass that can be adjusted by the wearer without tools and provides superior frontal impact resistance. Finally, there is a need in the art for an adjustable eyeglass that can be easily modified by the wearer for specific activities that is lightweight, structurally durable, and that provides easy and quick assembly and disassembly, and sufficient protection of the eyes, even in a bicycle racing posture.

Accordingly, in an embodiment, an eyeglass is provided for minimizing component structural integrity and component weight without reducing the overall structural integrity of the eyeglass. The eyeglass can comprise a unitary lens, a frame, and a nosepiece. The lens can have an upper edge and a lower edge. The upper edge can have lateral indents formed at opposing ends thereof, and the lower edge can have a nosepiece opening formed therein.

The frame can have opposing terminals and an upper groove extending at least partially along the frame. The upper groove can be sized and configured to receive the upper edge of the lens with the lateral indents of the lens being receivable into the opposing terminals of the frame. Further, the upper groove can have a cross-sectional area defined by a depth and width of the upper groove. Additionally, the frame can further have a post extending downwardly from a central portion of the frame.

The nosepiece can have a bridge and a mounting component extending upwardly from the bridge. The nosepiece can have a lower groove extending at least partially across the bridge, and the lower groove can be sized and configured such that the lower edge of the lens is receivable therein. The mounting component can be attachable to the post for attaching the nosepiece to the frame. In such an embodiment, the cooperative engagement of the frame to the nosepiece can retain the lens therebetween for minimizing the cross-section of the upper groove without compromising overall lens retention and the overall structural integrity of the eyeglass. For example, the transverse cross-sectional area of the upper groove can be less than approximately 0.05 square inches and in some embodiments no greater than about 0.02 square inches. Further, a maximum thickness of the frame can be less than 90% of a thickness of the lens along the upper edge thereof. Thus, eyeglass weight and structural integrity of individual components can decrease while maintaining the overall structural integrity of the eyeglass.

In another embodiment, the post can comprises a connecting portion at a distal end thereof. Additionally, the mounting component can comprise a recess being sized and configured to receive at least the connecting portion of the post for attaching the nosepiece to the frame. The recess of the mounting component can be formed into a posterior side of the mounting component. The post can also be formed to connect to the frame posteriorly to the groove. In some embodiments, the post can be integrally formed with the frame. Further, the lens can be configured to be mounted anterior to the post and the mounting component of the nosepiece. Finally, an as-molded configuration of the lens can corresponds to the upper groove of the frame and the lower groove of the nosepiece.

In accordance with yet another embodiment, the eyeglass can be configured to be adjustable in order to minimize a vertical deviation angle of a wearer in heads-down activities. The vertical deviation angle can be defined as the angular displacement between an optical centerline of the eyeglass and an intended line of sight of the wearer. The lens of the eyeglass can define the optical centerline. In such an embodiment, the mounting component can have a vertical height that is customizable for minimizing a desired vertical deviation angle of the wearer.

In another embodiment, the eyeglass can be adjustable for optimizing the protective function of the eyeglass throughout a range of vertical viewing angles, while preserving optical quality. In such an embodiment, adjustment of the mounting component's vertical height from a first vertical height to a second vertical height can raise the height of the lens to provide protection while viewing out of the top of the eyeglass, while maintaining a desired relationship between the LOS and OCL.

The nosepiece of the adjustable eyeglass can be selected from a plurality of nosepieces having different vertical heights. A corresponding plurality of lenses having matched vertical heights is also provided; each with an OCL in the vertical which is selected to correspond to the desired LOS for each lens-nose piece combination.

BRIEF DESCRIPTION OF THE DRAWINGS

The abovementioned and other features of the inventions disclosed herein are described below with reference to the drawings of the preferred embodiments. The illustrated embodiments are intended to illustrate, but not to limit the inventions. The drawings contain the following figures:

FIG. 3A is a rear view of the eyeglass wherein the frame, lens, and nose piece are in an assembled state.

FIG. 3B is a front view of the eyeglass of FIG. 3A.

FIGS. 4A-4C illustrate exemplary embodiments of nosepieces wherein a post of the nosepiece has a given vertical height.

FIG. 5A is a front view of the eyeglass wherein the frame and nose piece are assembled prior to installation of the lens, according to another embodiment.

FIG. 5B is a front view of the eyeglass of FIG. 5A in an assembled state.

DETAILED DESCRIPTION

While the present description sets forth specific details of various embodiments, it will be appreciated that the description is illustrative only and should not be construed in any way as limiting. Furthermore, various applications of such embodiments and modifications thereto, which may occur to those who are skilled in the art, are also encompassed by the general concepts described herein.

Figure 1:
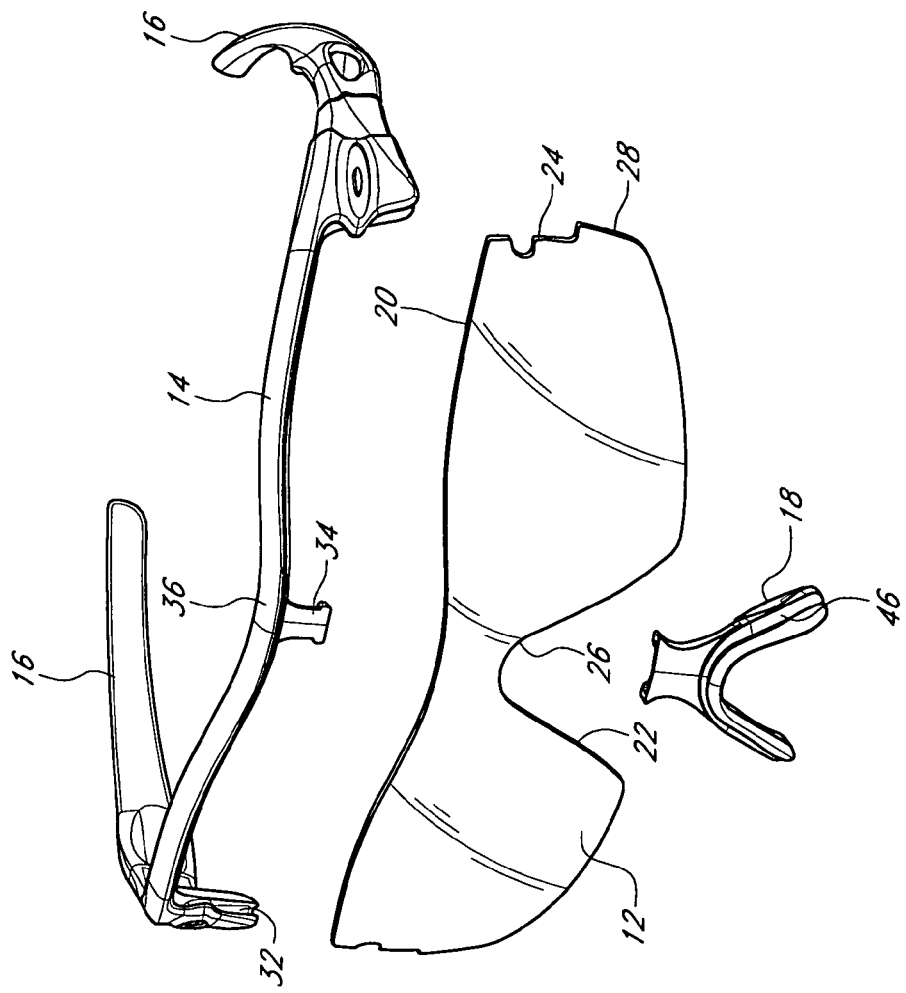
FIG. 1 is a perspective exploded front view of an adjustable eyeglass having a frame, lens, and a nose piece, according to an embodiment.

With reference to FIG. 1, an embodiment of a uniquely configured eyeglass 10 is provided that can reduce the overall weight of the eyeglass 10 and improve the optical qualities enjoyed by a wearer during various heads-up and heads-down activities. The eyeglass 10 can be manufactured from a variety of materials and methods. However, according to one of the unique aspects of the present invention, the eyeglass 10 can be assembled using lighter-weight components that may not otherwise be used due to structural strength requirements.

For example, in previous eyeglass designs, thicker, bulkier, and heavier designs have been used to provide sufficient durability and structural integrity for the eyeglass 10. However, as described further herein, the eyeglass 10 can be formed using lighter-weight components (which consequently may have lesser structural integrity than otherwise comparable heavier-weight components) without reducing the overall structural integrity of the eyeglass. Further, embodiments also provide substantial resistance to torsional and/or bending stresses.

In addition, an embodiment of the eyeglass 10 can also provide optimal optical characteristics to a wearer at a plurality of vertical viewing angles. As mentioned above, many sporting activities may be characterized as requiring the user to assume either a heads-up or a heads-down posture. In the heads-down posture, the wearer typically directs their desired line of sight (LOS) through an upper area of the eyeglass that may not provide the wearer of prior art glasses with the intended optimal optical qualities of the eyeglass as available when viewing in parallel to through an optical centerline (OCL) of the eyeglass.

Figure 6A:
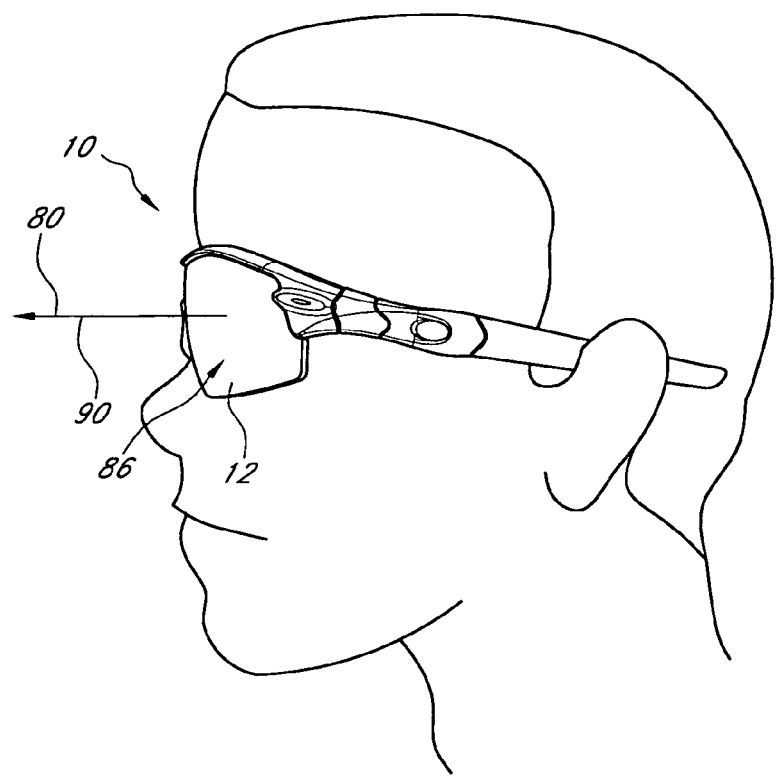
FIG. 6A is a side view of the eyeglass as worn on a wearer in a heads-up posture.
Figure 6B:
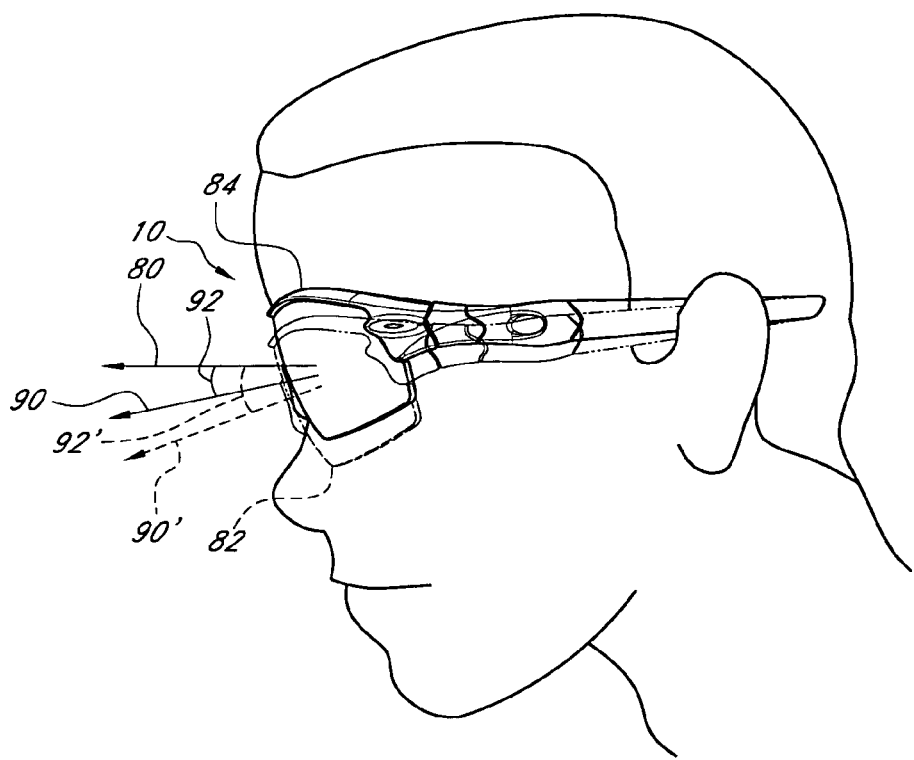
FIG. 6B is a side view of the eyeglass as worn on a wearer in a heads-down posture illustrating a vertical viewing angle defined by a line of sight of the wearer and an optical centerline of the eyeglass.

As shown in FIGS. 6A-6B, the angular divergence in the LOS 80 of the wearer with respect to the OCL 90 of the eyeglass 10 can be referred to as a vertical deviation angle 92. The vertical viewing angle 92 can also be defined as the angular displacement between the OCL 90 of the eyeglass 10 and the LOS 80 of the wearer. By reducing the vertical deviation angle 92, it is contemplated that the wearer can substantially benefit from improved optical qualities of the eyeglass 10 otherwise unavailable during typical heads-down activities and due to non-normal facial structures.

In FIG. 1, the eyeglass 10 is illustrated as including a lens 12, a frame 14, a pair of opposing earpieces 16, and a nosepiece 18. These components of the eyeglass 10 can be configured as snap fit components that allow the wearer to quickly assembly or disassemble the eyeglass 10 without the use of tools. The lens 12 can be formed in a variety of configurations and geometries. Preferably, the lens 12 is configured to be lightweight and to provide superior optical qualities throughout the field of view of the wearer. It is contemplated that the lens 12 can be formed utilizing a dual or unitary design. As shown in FIG. 1, the lens 12 has an upper edge 20 and a lower edge 22. As shown in FIGS. 6A-6B, the lens 12 can also define the optical centerline (OCL) 90. See e.g. U.S. Pat. No. 6,010,218 to Houston, et al., entitled Decentered Corrected Lens for Eyewear, the disclosure of which is incorporated in its entirety by reference herein, particularly with respect to lens construction, design and optics.

The upper and lower edges 20, 22 can be formed according to a variety of shapes and contours, as described further below. The lens 12 can also include a pair of opposing lateral indents 24 formed in opposing side edges 28 thereof. The lateral indents 24 can be voids in the lens, and shaped in a variety of designs, as also described further below. Finally, the lens 12 can also include a nosepiece opening 26 wherein to the nosepiece 18 can be at least partially received.

Figure 2:
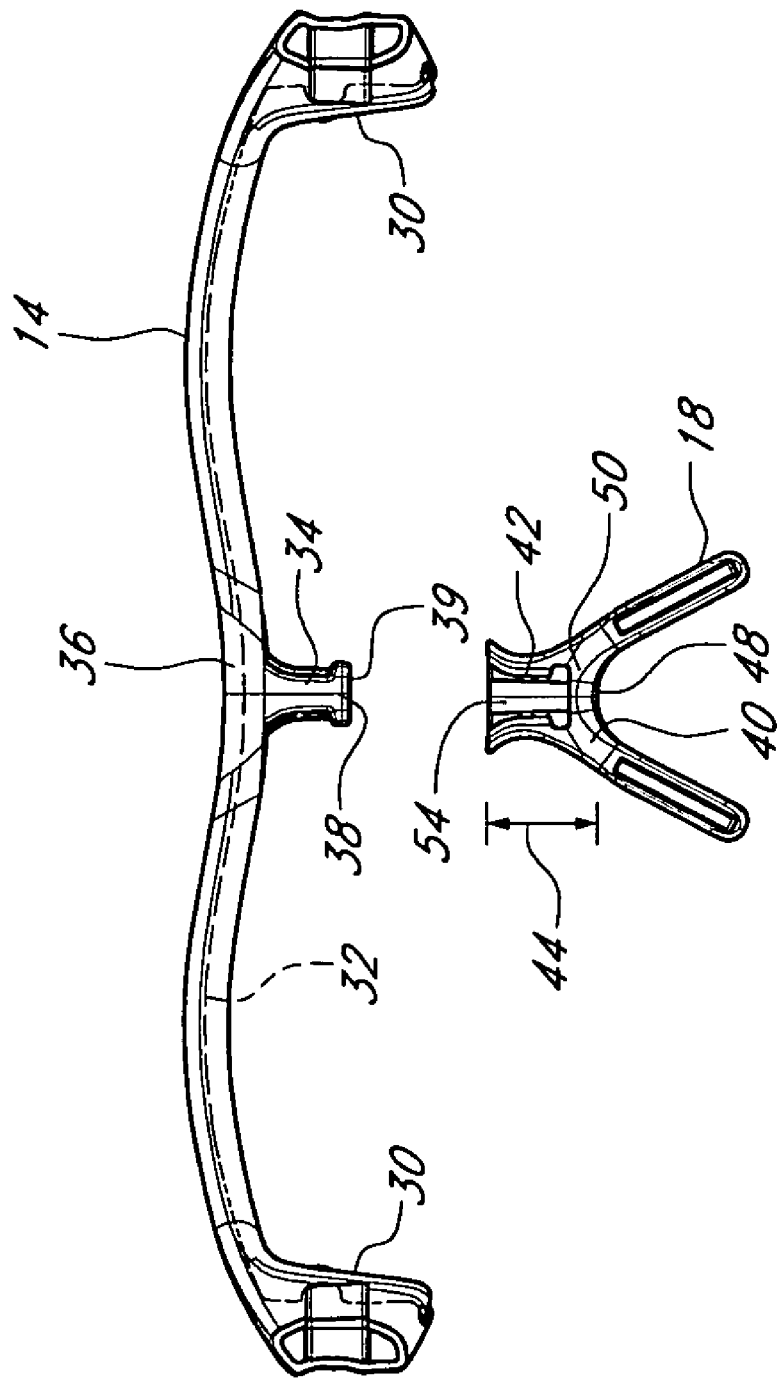
FIG. 2 is a rear view of the frame and nose piece illustrated in FIG. 1.

As shown in FIGS. 1-2, the frame 14 can be configured to comprise opposing terminals 30 and an upper groove 32, which can collectively form an upper lens receiving portion. In an embodiment, the opposing terminals 30 are sized and configured to mate with at least a portion of the respective ones of the side edges 28 of the lens 12. Preferably, the terminals 30 are formed to removably receive the respective ones of the opposing lateral indents 24 of the lens 12.

Figure 8:
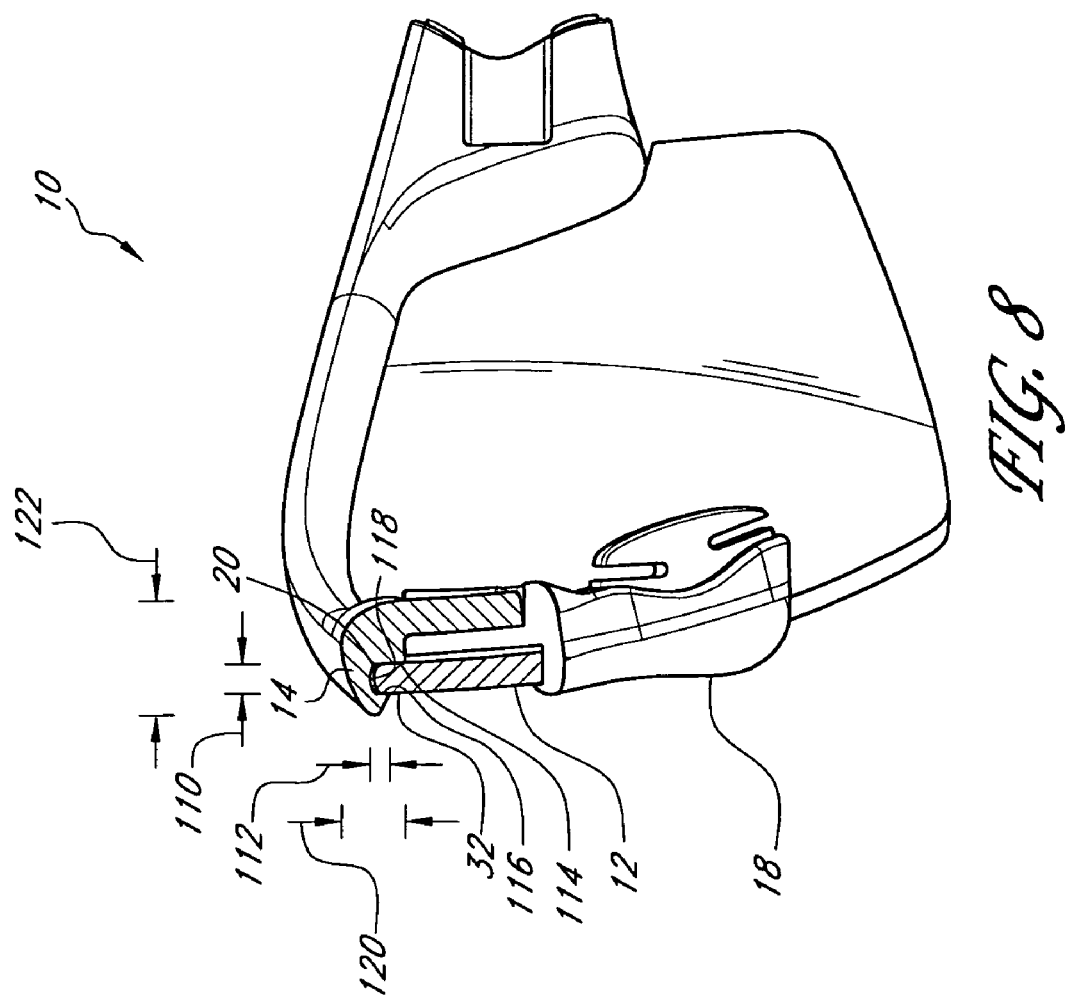
FIG. 8 is a side cross-sectional view of the eyeglass of FIG. 3B, illustrating a upper groove within the frame and the interconnection of the lens with the frame.

The upper groove 32 can extend at least partially along the frame 14, and preferable extends intermediate the opposing lateral indents 30. The upper groove 32 is preferably sized and configured to receive the upper edge 20 of the lens 12. As shown in the embodiment illustrated in FIG. 8, the upper groove 32 can define a lengthwise slot having a width 110 and a depth 112. The upper groove 32 can be formed having internal faces that are of differing or equal dimensions. For example, as shown in FIG. 8, a rear face 114 can be of a greater cross-sectional length than a forward face 116, and can further differ from that of the upper face 118 of the upper groove 32. The rear, forward, and upper faces 114, 116, 118 of the upper groove 32 can be modified to provide varying degrees of retention of the upper edge 20 of the lens 12 within the upper groove 32.

The opposing terminals 30 can be formed with the upper groove 32 extending at least partially therealong. In this regard, the eyeglass 10 can be at least partially assembled with the lateral indents 24 of the lens 12 being received into the opposing terminals 30 of the frame 12 and the upper edge 20 of the lens 12 being at least partially received within the upper groove 32. As mentioned above, the lateral indents 24 of the lens 12 can be variously configured, and can include distinctive geometric patterns that tend to interlock with a corresponding geometric pattern of the terminals 30. Such a feature can tend to ensure that the lens 12 is urged to within the upper groove 32 and properly fits with the frame 14. Such a feature may also be utilized to help the wear ensure that the lens 12 is in an engaged position with the frame 14 during assembly. As such, the lens 12 can be configured to be received within the upper groove 32 for vertically securing the upper edge 20 of the lens 12, and the opposing lateral indents 24 can be received within the respective ones of the opposing terminals 30 of the frame 14 for horizontally securing the lens 12 to the frame 14.

In accordance with an embodiment, the frame 14 can further comprise a post 34 extending downwardly from a central portion 36 of the frame 14. The post 34 can be formed in a variety of geometric shapes, as described herein. Preferably, the post 34 can be substantially rectangular in shape and of sufficient width and thickness to provide firm engagement with the nosepiece 18, as discussed further below. The post 34 is preferably integrally formed with the frame 14, such as being formed of a single, continuous piece of material as in injection molding. Alternatively, the post 34 can be formed of separate a material and can be joined to the frame 14 using an adhesive, mechanical interlock, interference fit or other fastener. Finally, as shown in FIG. 2, the post 34 can also comprise a connecting portion 38 which may be formed at a distal end 39 of the post 34.

FIGS. 1-2 also illustrate an exemplary configuration of the nosepiece 18 wherein the nosepiece 18 has a bridge 40 and a mounting component 42 which may extend upwardly from the bridge 40 and having a vertical height 44. The bridge 40 and the mounting component 42 are preferably integrally formed, as by injection molding, but can also be formed from separate, joinable materials.

The nosepiece 18 can further comprise a lower groove 46 that is formed along at least a portion of the bridge 40. For example, the lower groove 46 can extend at least partially along the bridge 40, as shown in FIG. 1. The lower groove 46 of the bridge 40 is preferably sized and configured to removably receive the lower edge 22 of the lens 12. In particular, the lower groove 46 can be shaped to conform to the shape and size of the nosepiece opening 26 of the lens 12.

The mounting component 42 can be sized and configured to be attachable to the post 34 of the frame 14. The attachment of the post 34 to the mounting component 42 can be accomplished in a variety of configurations, such as with male and female-type interlocking connections and other first and second complementary surface structures. For example, one of the post 34 or the mounting component 42 can be formed as a male-type connector that can be removably connected to a corresponding female-type connector of the other one of the post 34 and the mounting component 42.

As illustrated in FIG. 2, a posterior side 50 of the mounting component 42 can be formed to include a recess 54 into which the post 34 can be received. In such an embodiment, the connector portion 38 of the post 34 can be formed to mate with the recess 54 of the mounting component 42. Alternatively, an anterior side 52 of the nosepiece 18 can be configured to include the recess 54. Furthermore, it is also possible that the post 34 could include a recess and the mounting component 42 can be receivable therein. Such alternative embodiments and modifications are considered to be within the scope of the present disclosure and teachings.

FIGS. 3A-3B illustrate the cooperative engagement of the lens 12, frame 14, and nosepiece 18. In such an embodiment, the post 34 can be connected to the frame 14 posterior to the upper lens groove 32. In addition, the lens 12 can be configured to be mounted anterior to the post 34 and the mounting component 42 of the nosepiece 18. An as-molded configuration of the lens 12 can correspond to the upper groove 32 of the frame 14 and the lower groove 46 of the nosepiece 18.

The cooperative engagement provided by such an embodiment can provide significant advantages that can allow for the reduction in weight of such components without reducing the overall durability and structural integrity of the eyeglass 10. Further, in some embodiments, due to the engagement of the side edges 28 and/or lateral indents 24 of the lens 12 with the opposing terminals 30 of the frame 14, the eyeglass 10 can withstand torsional and/or bending stresses. In this regard, it is contemplated that the engagement of the side edges 28 and/or lateral indents 24 of the lens 12 with the opposing terminals 30 of the frame 14 can further stabilize and mitigate against such torsional and bending forces commonly encountered during use of the eyeglass 10. As a result, the lens 12 can be more surely retained by the frame 14 and nosepiece 18.

FIG. 3A is a rear view of the eyeglass 10 in an assembled state, and FIG. 3B is a front view thereof. As shown in FIG. 3A, the mounting component 42 of the nosepiece 18 is attached to the post 34 of the frame 14 to fix the vertical relative positioning of the nosepiece 18 to the frame 14. Further, with the lens 12 installed, the mounting component 42 is also illustrated as being disposed intermediate the lens 12 and the post 34 of the frame 14 to fix the horizontal relative positioning of the nosepiece 18 relative to the frame 14, as shown in FIGS. 3A-3B.

During assembly, the lens 12 can be installed after the assembly of the frame 14 and nosepiece 18, although this is not required. Once assembled, the lens 12 can therefore be cooperatively engaged by the frame 14 and the nosepiece 18, which can be held in fixed relation to each other when the lens 12 is installed. Due to the fixed relationship of the frame 14 and the nosepiece 18, the upper and lower grooves 32, 46 can also be in substantially fixed relation relative to each other, thereby ensuring that the lens 12 is properly retained therein. Thus, such an embodiment can ensure maximum overall retention of the lens 12 and structural integrity of the eyeglass 10.

As mentioned above, another of the significant advantages provided by embodiments disclosed herein is the reduction, minimization, and/or elimination of the vertical deviation angle that otherwise would have been induced by positioning the upper frame at different vertical heights relative to the wearer's nose. Thus, during activities, such as bicycle racing and others that encourage a heads-down posture, the wearer can adjust the eyeglass 10 by selectively interchanging the nosepiece 18 and mounting a corresponding lens to change the primary LOS while still allowing the wearer to enjoy the superior optical qualities of the lens 12.

Referring now to FIGS. 4A-4C, rear views of various embodiments of the nosepiece 18 are illustrated. As shown therein, the mounting component 42 of a first nosepiece 18' can be of a first vertical height 44', a second nosepiece 18" can correspond to a second vertical height 44", and a third nosepiece 18''' can correspond to a third vertical height 44'''. The vertical height 44 can generally be measured from a nasal apex 48 to a top end 62 of the nosepiece 18. FIGS. 4A-4C illustrate an exemplary group of nosepieces 18 that can be interchangeably used in some embodiments. These illustrations are provided for illustrative purposes only, and it is contemplated that various other sizes and/or configurations of the nosepiece 18 can be provided. As discussed above, the mounting component 42 can be interconnectable with the post 34 of the frame 14. It is contemplated that the wearer can select a nosepiece 18 having a specific vertical height 44 according to their needs and/or preferences. When fitted onto the eyeglass 10, the selected nosepiece 18 could thus provide a customized fit of the eyeglass 10 on the wearer. Each nosepiece is matched to a corresponding lens which has an OCL positioned in the vertical to remain substantially parallel to a wearer's intended LOS through that lens-nosepiece combination.

The vertical heights 44 of nosepieces 18 within a group of available nosepieces 18 can lie within a given range. For example, the vertical height 44 of a given one of the nosepieces can be within a preferred range of about one inch, such as +0.75/−0.250 inches. Height 44 may be, for example, about 0.25", 0.5", 0.75" and 1.0 inch, or two or more nosepieces may be provided with ⅛ inch increments. The range can be broadened or modified depending on the geometries of the eyeglass 10 and in light of other considerations, such as the target activity, target consumer, etc.

It is contemplated that by interchanging the nosepiece 18 with one having a different vertical height 44, the wearer could modify upper edge of the lens 12 relative to the wearer's nose or straight ahead LOS 80. There can be provided a progression of nosepiece sizes. Thus, the wearer can selectively customize the eyeglass 10 (and also use the eyeglass 10 for various activities) such that the vertical height of the lens and the viewing angle through the lens are optimized for a particular use, and the wearer's LOS 80 can still pass through the lens 12 more closely to parallel to the OCL, as explained further below with reference to FIGS. 6A-6B.

According to another aspect illustrated in FIGS. 4A-4C, the nosepiece 18 can further comprise a collar portion 56 and nose pad 58. The nose pad 58 can comprise single or dual nose pads that are attached to or formed integrally with the nosepiece 18. The nose pad 58 can be attached to a bottom portion 60 of the nosepiece 18. The collar portion 56 can generally extends intermediate the nose pad 58 and the lower groove 46. In this regard, the collar portion 56 can vary in size and configuration depending on the vertical height of the mounting component 42, as illustrated in FIGS. 4A-4C.

Additionally, it is contemplated that the lower groove 46 of the nosepieces 18', 18", and 18''' can be maintained in fixed relation relative to the top end 62 of the nosepieces 18', 18", and 18'''. In the embodiment illustrated in FIG. 4A, the nose pad 58 and the lower groove 46 can be positioned generally contiguously to the nosepiece opening 26 of the lens 12 when assembled thereto. However, when the vertical viewing angle 92 is adjusted by increasing the vertical height 44, such as to the vertical height 44" or 44''' of FIG. 4B or 4C, respectively, a vertical gap can result between the vertical position of the lower groove 46 and the nose pad 58. Accordingly, the collar portion 56 can help compensate for any such gap by filling the gap therebetween. The collar portion 56 can be solid, perforated, or otherwise configured. Therefore, the face and eyes of the wearer can be protected from air or other matter that could otherwise flow through such a gap.

FIG. 5A illustrates an exploded view of an embodiment of the eyeglass 10 wherein the lens 12 can be installed/engaged onto the frame 14 and the nosepiece 18. Further, when disassembling the eyeglass 10 for adjustment or repair, the lens 12 can be disengaged from the frame 14 and the nosepiece 18 without requiring that other components of the eyeglass 10 be disassembled or removed prior to the disengagement of the lens 14. The engagement and disengagement of the lens is accomplished as described herein (forward and reverse order, respectively), by inserting the upper edge 20 of the lens 12 into the upper groove 32 and the opposing terminals 30, and then inserting the lower edge 22 of the lens 12 into the lower groove 46 of the nosepiece 18. This process can be accomplished by gently bending the lens 12. The lens 12 can snap into place when properly engaged. In this manner, the wearer can selectively adjust the eyeglass 10 to fit using interchangeable nosepieces 18.

FIG. 5B is a front view of the eyeglass 10 illustrating the installation and fit of a plurality of nosepieces 18', 18", and 18'''. As discussed above, the different vertical heights 44', 44", and 44''' (see FIGS. 4A-4C) can allow the wearer to adjust the fit of the eyeglass 10 to a corresponding elevation, thereby providing for the adjustment of the vertical viewing angle 92. The configuration of the nosepiece 18 can be modified to include any variety of sizes, shapes, nose pads, materials, collar portion configurations, and other features, and can correspond to an elevation of the eyeglass 10 on the face of the wearer, measured for example, with respect to the wearer's eyebrow.

Referring now to FIGS. 6A-6B, side views are shown of a wearer's head having the eyeglass 10 thereon. In FIG. 6A, the wearer's head and the eyeglass 10 is in a generally heads-up position, and the OCL 90 of the lens 12 is generally horizontal (straight ahead). Further, the LOS 80 of the wearer is also generally horizontal, and substantially parallel with the OCL 90 of the lens 12.

However, in FIG. 6B, an eyeglass 82 is illustrated in hidden lines wherein the eyeglass 82 is not adjusted to compensate for the vertically elevated (with respect to the lens) LOS 80. Thus, the LOS 80 of the wearer would pass through an upper portion of the lens of the eyeglass 82, closer to the upper frame. Such as result provides poor optical results and also inferior protection from wind, light and debris. In addition, the wearers LOS 80 could be obstructed by the frame of the eyeglass 82. In any event, with the frame of the eyeglass being so close to the LOS 80, the wearer's field of view could certainly be reduced.

In contrast, FIG. 6B also shows an eyeglass 84 wherein the vertical height of the nosepiece has been increased and a lens with a corresponding configuration has been inserted to reduce the vertical deviation angle 92 and provide superior eye protection. As shown in FIG. 6B, the LOS 80 of the wearer tends to pass more closely through a central portion of the lens, and is more aligned with the OCL 90 of the lens. Such an implementation can tend to improve the overall optical qualities enjoyed by the wearer. Further, such an embodiment tends to ensure that the wearer's LOS 80 is not obstructed by the frame of the eyeglass 84 when the wearer assumes a head-down posture.

Figure 7B:
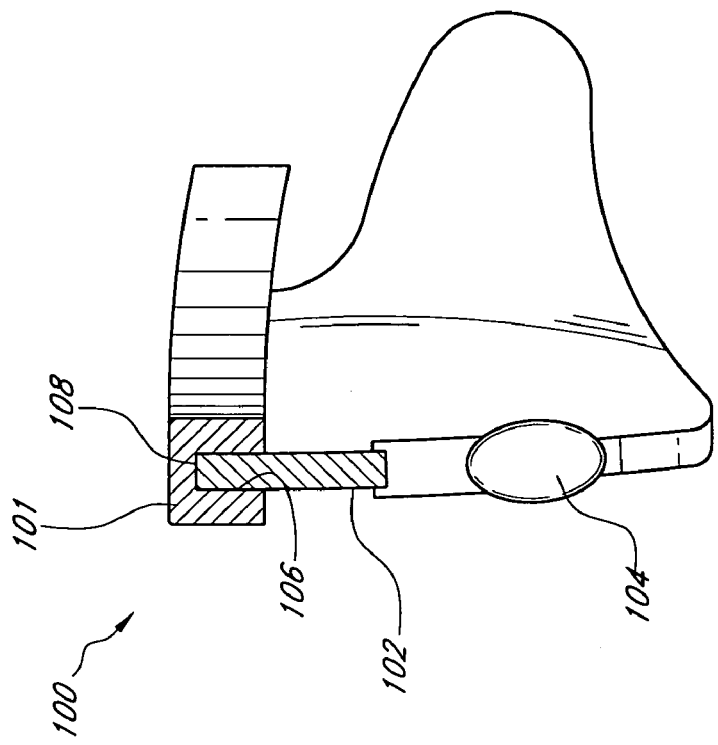
FIG. 7B is a side cross-sectional view of the prior art eyeglass of FIG. 7A illustrating depth of a groove within a frame of the eyeglass wherein a lens is retained.
Figure 7A:
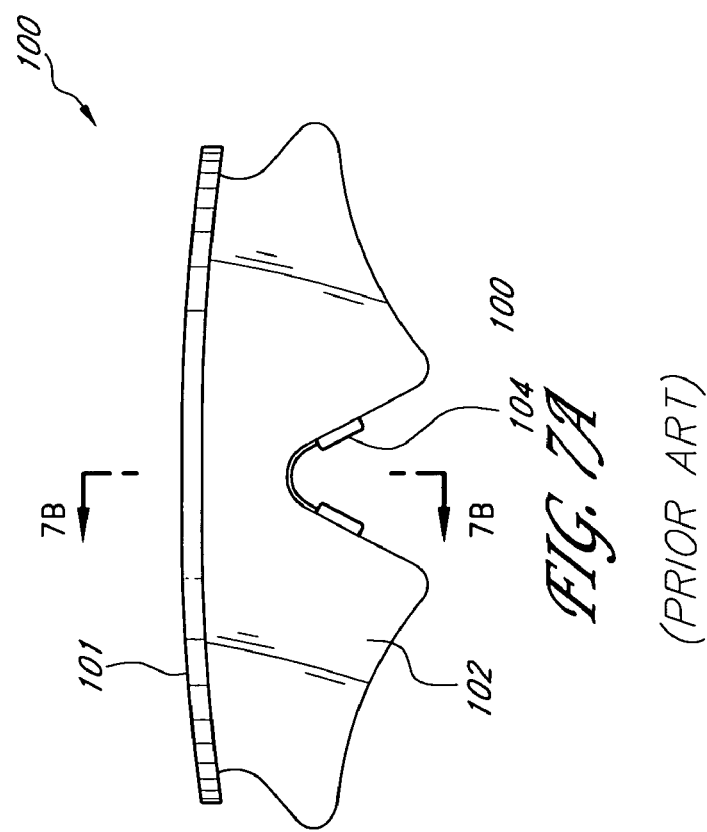
FIG. 7A is a front view of a prior art eyeglass.

FIGS. 7A-7B illustrate front and cross-section views, respectively, of an exemplary prior art sunglass 100. The sunglass 100 includes a frame 101, a lens 102, and a nosepiece 104. The frame 101 includes a groove 106 and the lens 102 has an upper edge 108 that is received into the groove 106 of the frame 101. As shown in the cross-sectional view of FIG. 7B, the groove 106 is used to entirely support the lens 102 and the nosepiece 104. Thus, the groove 106 of such a sunglass 100 must be particularly deep, thick, and generally more robust. In some prior art sunglasses, the lens groove can be as deep as 0.10 inches. As a result, the overall weight and appearance of the sunglass 100 may be heavier and more bulky.

In contrast, a side view of the embodiment illustrated in FIG. 5B is shown in FIG. 8, which further illustrates the above-mentioned features of lightweight configuration and cooperative engagement of the eyeglass 10. As shown therein, the upper groove 32 be generally defined by the width 110 and the depth 112. In further contrast to the prior art sunglass of FIGS. 7A-B, the depth 112 of the eyeglass 10 can be within the range of about 0.030-0.080 inches. Preferably, the depth 112 is less than or equal to about 0.050 inches. The much smaller depth 112 consequently allows more material to be removed from the frame 14, thereby allowing the weight of the frame to be reduced, due to the structural contribution of the nose-piece and lens.

In some embodiments of the frame 14, the maximum thickness 120 of the frame 14 in the vertical dimension is preferably less than 90% of the thickness of the lens 12, for example, along the upper edge 20 of the lens 12. In other embodiments, the thickness of the lens 12 can also be greater than the thickness 120 of the frame 14 in the vertical direction. The maximum width 122 of the frame 14 in the horizontal dimension is preferably less than 350% of the thickness of the lens 12. As illustrated in FIG. 8, the contour and cross-sectional configuration of the frame 14 can be variously designed. Therefore, the dimensions and shape of the frame 14 can be modified. However, it is contemplated that the cross-section of the frame 14 can be substantially minimized by employing the teachings herein.

As mentioned above, the upper groove 32 can be formed having internal faces that are of differing or equal dimensions. The upper groove 32 can have a cross-sectional area defined by the width 110 and the depth 112, and perhaps by the rear face 114, forward face 116, and the upper face 118. Preferably, the cross-sectional area of the upper groove 32 is approximately equal to or less than 0.02 square inches. In this regard, the cross-sectional area of the lens 12 that is engaged within the upper groove 32 can preferably be less than approximately 0.02 square inches. The rear face 114 can be of a greater cross-sectional length than a forward face 116, and can further differ from that of the upper face 118 of the upper groove 32. The rear, forward, and upper faces 114, 116, 118 of the upper groove 32 can be modified to provide varying degrees of retention of the upper edge 20 of the lens 12 within the upper groove 32.

Although these inventions have been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof. In addition, while several variations of the inventions have been shown and described in detail, other modifications, which are within the scope of these inventions, will be readily apparent to those of skill in the art based upon this disclosure. It is also contemplated that various combination or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

What is claimed is:

1. An eyeglass for minimizing component weight without reducing the overall structural integrity of the eyeglass, the eyeglass comprising:

a unitary lens having an upper edge and a lower edge, the upper edge having lateral connectors formed at opposing ends thereof, the lower edge having a nosepiece opening formed therein;

a frame having opposing terminals and an upper groove extending at least partially along the frame, the upper groove being sized and configured to receive the upper edge of the lens with the lateral connectors of the lens being receivable into the opposing terminals of the frame, the upper groove having a cross-sectional area defined by a depth and width of the upper groove, the frame further having a post extending downwardly from a central portion of the frame; and a nosepiece having a bridge and a mounting component extending upwardly from the bridge, the nosepiece having a lower groove extending at least partially across the bridge, the lower groove being sized and configured with the lower edge of the lens being receivable therein, the mounting component being attachable to the post for attaching the nosepiece to the frame;

wherein cooperative engagement of the frame to the nosepiece is operative to retain the lens therebetween for minimizing the cross-section of the upper groove without compromising overall lens retention and the overall structural integrity of the eyeglass.

2. The eyeglass of claim 1 wherein the cross-sectional area of the upper groove is approximately less than 0.02 square inches.

3. The eyeglass of claim 1 wherein a maximum thickness of the frame is less than 90% of a thickness of the lens along the upper edge thereof.

4. The eyeglass of claim 1 wherein the post comprises a connecting portion at a distal end thereof, and the mounting component comprises a recess being sized and configured to receive at least the connecting portion of the post for attaching the nosepiece to the frame.

5. The eyeglass of claim 1 wherein the post connects to the frame posteriorly to the groove.

6. The eyeglass of claim 1 wherein the post is integrally formed with the frame.

7. The eyeglass of claim 1 wherein the recess of the mounting component is formed into a posterior side of the mounting component.

8. The eyeglass of claim 1 wherein an as-molded configuration of the lens corresponds to the upper groove of the frame and the lower groove of the nosepiece.

9. The eyeglass of claim 1 wherein the lens is configured to be mounted anterior to the post and the mounting component of the nosepiece.

10. An adjustable eyeglass for optimizing a vertical viewing angle of a wearer during a heads-down activity, comprising:

a unitary lens having an upper edge and a lower edge and defining the optical centerline;

a frame having an upper lens receiving portion and a post, the upper lens receiving portion extending at least partially along the frame, the post extending downwardly from a central portion of the frame, the post being integrally formed with the frame; and a nosepiece having a bridge and a mounting component extending upwardly from the bridge, the nosepiece having a lower groove extending at least partially across the bridge, the lower groove being sized and configured with the lower edge of the lens being receivable therein, the mounting component being attachable to the post for attaching the nosepiece to the frame and for supporting the lens between the nosepiece and the frame, the mounting component having a vertical height, the vertical height of the nosepiece being customizable for optimizing the vertical viewing angle of the wearer.

11. The eyeglass of claim 10 wherein the nosepiece is selected from a plurality of nosepieces having different vertical heights.

12. The eyeglass of claim 11 wherein a selected nosepiece is interchangeable with another selected nosepiece.

13. The eyeglass of claim 10 wherein the nosepiece further comprises a nose pad and a collar portion, the nose pad being formed along a bottom portion of the bridge, the collar portion being formed along the bridge and extending intermediate the lower groove of the bridge and the nose pad.

14. The eyeglass of claim 13 wherein the collar portion varies in size relative to the vertical height of the mounting component.

15. The eyeglass of claim 10 wherein the post comprises a connecting portion at a distal end thereof, and the mounting component comprises a recess being sized and configured to receive at least the connecting portion of the post for attaching the nosepiece to the frame.

16. The eyeglass of claim 15 wherein the recess of the mounting component is formed into a posterior side of the mounting component.

17. The eyeglass of claim 10 wherein the post extends downwardly from a central portion of the frame posterior to the lens receiving portion of the frame.

18. An adjustable eyeglass system for optimizing optical characteristics of the eyeglass along a line of sight of a wearer, the eyeglass comprising:

at least a first and a second unitary lenses having an upper edge and a lower edge, each lens defining an optical centerline;

a frame having an upper groove and a post, the upper groove extending at least partially along the frame, the post extending downwardly from a central portion of the frame, the post being integrally formed with the frame; and at leas a first and a second nosepiece having a bridge and a mounting component extending upwardly from the bridge, the mounting component being attachable to the post for attaching the nosepiece to the frame and for cooperatively retaining the lens between the nosepiece and the frame, the mounting components having a first and a second vertical height;

wherein removing the first nose piece and first lens and mounting the second nose piece and second lens to the frame moves the optical centerline from a first angle to a second angle with respect to a straight ahead line of sight, and changes the height of the lens in the vertical relative to the wearer's straight ahead line of sight.

19. The eyeglass of claim 18 wherein the second lens has a greater vertical height above the nose piece opening than the first lens.

20. The eyeglass of claim 18 wherein the nosepieces are selected from a plurality of nosepieces having different vertical heights, the selected nosepiece being interchangeable with another selected nosepiece.

* * * * *

UNITED STATES PATENT AND TRADEMARK OFFICE
CERTIFICATE OF CORRECTION

PATENT NO. : 7,347,545 B1  Page 1 of 1
APPLICATION NO. : 11/545103
DATED : March 25, 2008
INVENTOR(S) : Jannard et al.

It is certified that error appears in the above-identified patent and that said Letters Patent is hereby corrected as shown below:

On the title page item (57), (Abstract), line 1, after "for" insert -- minimizing --.
On the title page item (57), (Abstract), line 12, delete "nose pieces" and insert --nosepieces --, therefore.
At column 1, line 41, delete "characterisitics" and insert -- characteristics --, therefore.
At column 1, line 56, delete "angularaly" and insert -- angularly --, therefore.
At column 3, line 43, delete "lens-nose piece" and insert -- lens-nosepiece --, therefore.
At column 3, line 53, delete "nose piece" and insert -- nosepiece --, therefore.
At column 3, line 55, delete "nose piece" and insert -- nosepiece --, therefore.
At column 3, line 58, delete "nose piece" and insert -- nosepiece --, therefore.
At column 3, line 64, delete "nose piece" and insert -- nosepiece --, therefore.
At column 4, line 12, delete "a" and insert -- an --, therefore.
At column 5, lines 22-23 (approx.), delete "wherein to" and insert -- whereinto --, therefore.
At column 12, line 39, in Claim 18, delete "at leas" and insert -- at least --, therefore.
At column 12, line 46 (approx.), in Claim 18, delete "nose piece" and insert -- nosepiece --, therefore.
At column 12, line 47 (approx.), in Claim 18, delete "nose piece" and insert -- nosepiece --, therefore.
At column 12, line 54, in Claim 19, delete "nose piece" and insert -- nosepiece --, therefore.

Signed and Sealed this

Sixteenth Day of September, 2008

JON W. DUDAS
*Director of the United States Patent and Trademark Office*